United States Patent [19]

Glenn

[11] 4,135,362
[45] Jan. 23, 1979

[54] VARIABLE VANE AND FLOWPATH SUPPORT ASSEMBLY FOR A GAS TURBINE

[75] Inventor: Robert G. Glenn, Lower Moreland Township, Montgomery County, Pa.

[73] Assignee: Westinghouse Electric Corp., Pittsburgh, Pa.

[21] Appl. No.: 848,009

[22] Filed: Nov. 3, 1977

Related U.S. Application Data

[63] Continuation of Ser. No. 656,496, Feb. 9, 1976, abandoned.

[51] Int. Cl.² ............................ F02C 3/10; F01D 7/12
[52] U.S. Cl. .................................. 60/39.16 R; 415/160; 415/115
[58] Field of Search ................... 60/39.16 R; 415/115, 415/137, 160, 162, 116, 117

[56] References Cited

U.S. PATENT DOCUMENTS

| | | | |
|---|---|---|---|
| 2,923,459 | 2/1960 | Taylor | 415/160 |
| 3,224,194 | 12/1965 | DeFeo et al. | 415/160 |
| 3,295,827 | 1/1967 | Chapman et al. | 415/160 |
| 3,558,237 | 1/1971 | Wall | 415/160 |
| 3,584,458 | 6/1971 | Wetzler | 415/115 |
| 3,680,309 | 8/1922 | Wallace | 60/39.16 R |
| 3,777,479 | 12/1973 | Hagen | 60/39.16 R |

Primary Examiner—Louis J. Casaregola
Attorney, Agent, or Firm—F. A. Winans

[57] ABSTRACT

A variable area turbine nozzle vane is supported from stationary housing structure and disposed in a confined fluid flow path between the gas generator and the power turbine of a split shaft gas turbine engine. The radially innermost structure defining the flow path for the working fluid is supported by a strut passing through, and also supporting, a hollow variable vane so that no external support struts are present in the flow path of the working fluid.

9 Claims, 5 Drawing Figures

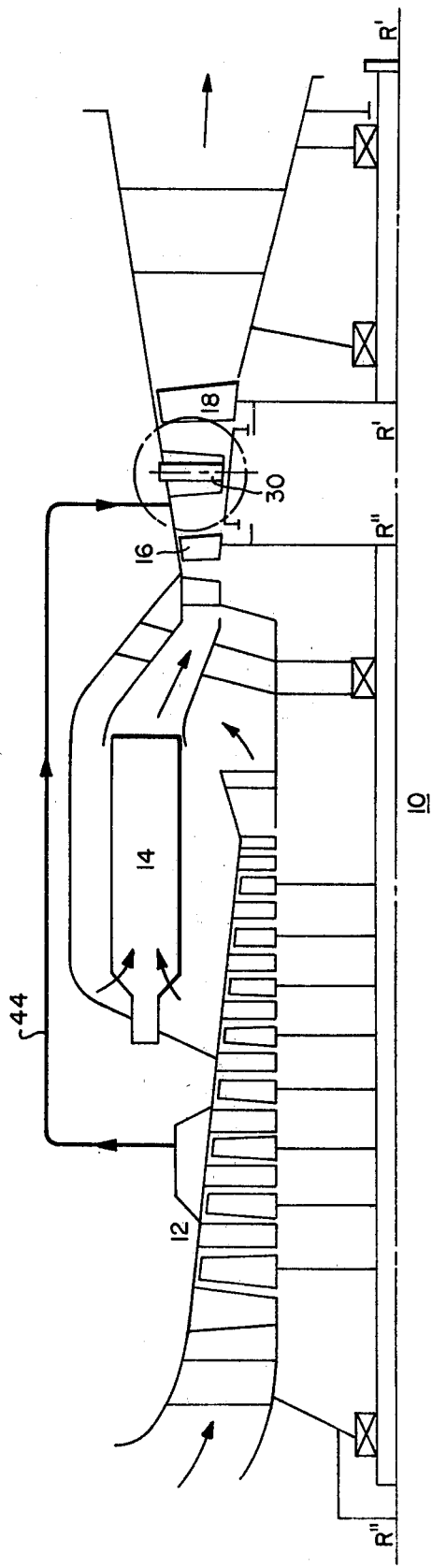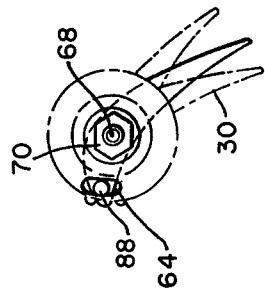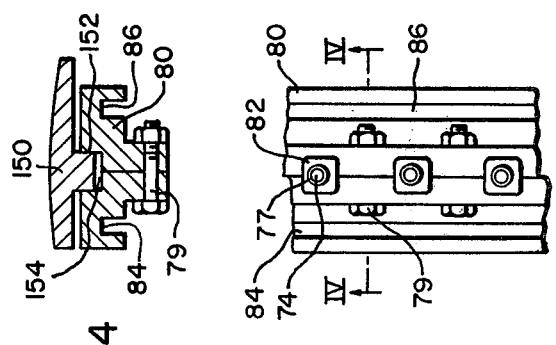

VARIABLE VANE AND FLOWPATH SUPPORT ASSEMBLY FOR A GAS TURBINE

This is a continuation of application Ser. No. 656,496, filed Feb. 9, 1976, now abandoned.

BACKGROUND OF THE INVENTION

1. Field of the Invention

The invention relates to a split shaft gas turbine, and more particularly, to a variable vane and support assembly providing a confined flow path between the last stage of a gas generator and the first stage of the low pressure turbine thereof.

2. Description of the Prior Art

In certain applications, such as marine propulsion units, it is often desirable to have a gas turbine in which the speed of the power turbine can be varied independently of the speed of the gas generator. The gas turbine employed in such situations comprises a split shaft arrangement in which a compressor is driven by a turbine and a low pressure turbine drives a power take-off. The turbine and compressor are generally referred to as a gas generator. In operation, the above-named components are serially connected in an axial flow path initiating with the compressor, then to a combustor which in turn discharges to the high pressure turbine in slow communication with the low pressure turbine after which the working fluid is discharged.

The speed of the low pressure turbine can be varied by disposing within the flow path between the last stage of the high pressure turbine and the first stage of the low pressure turbine a nozzle vane capable of various angular settings to control the flow characteristics of the working fluid entering the low pressure turbine.

The variable nozzle vane is disposed adjacent to the first stage low pressure turbine blades at the terminal end of a confined passageway leading from the high pressure turbine discharge. The confined passageway is defined by stationary radially inner and outer wall members. Support for the inner wall member, in that it is adjacent rotating apparatus except for the outer wall member and the variable vanes, normally requires a strut extending through the flow path to support the inner wall from the outer wall. The strut introduces disturbances in the flow of the working fluid that reduce the overall efficiency of the turbine engine.

SUMMARY OF THE INVENTION

The present invention provides a variable nozzle vane in the flow path between the last stage of a gas generator and the first stage of a low pressure turbine of a split shaft gas turbine. The variable vane is hollow to allow a support strut to pass therethrough to support both the vane and the inner structure defining the confined flow path to the vane. Thus, there are no support struts in the flow path to effect the flow of the working fluid. Also, the strut is hollow and provides a conduit for delivering cooling air to the rotating discs and inner structure of the turbine in the vicinity of the variable vane.

DESCRIPTION OF THE DRAWINGS

FIG. 1 is a schematic view of a typical split shaft gas turbine arrangement;

FIG. 3 is a view along lines III—III of FIG. 2;

FIG. 4 is a view along lines IV—IV of FIG. 3; and,

FIG. 5 is a view along lines V—V of FIG. 2.

DESCRIPTION OF THE PREFERRED EMBODIMENT

Figure 2:
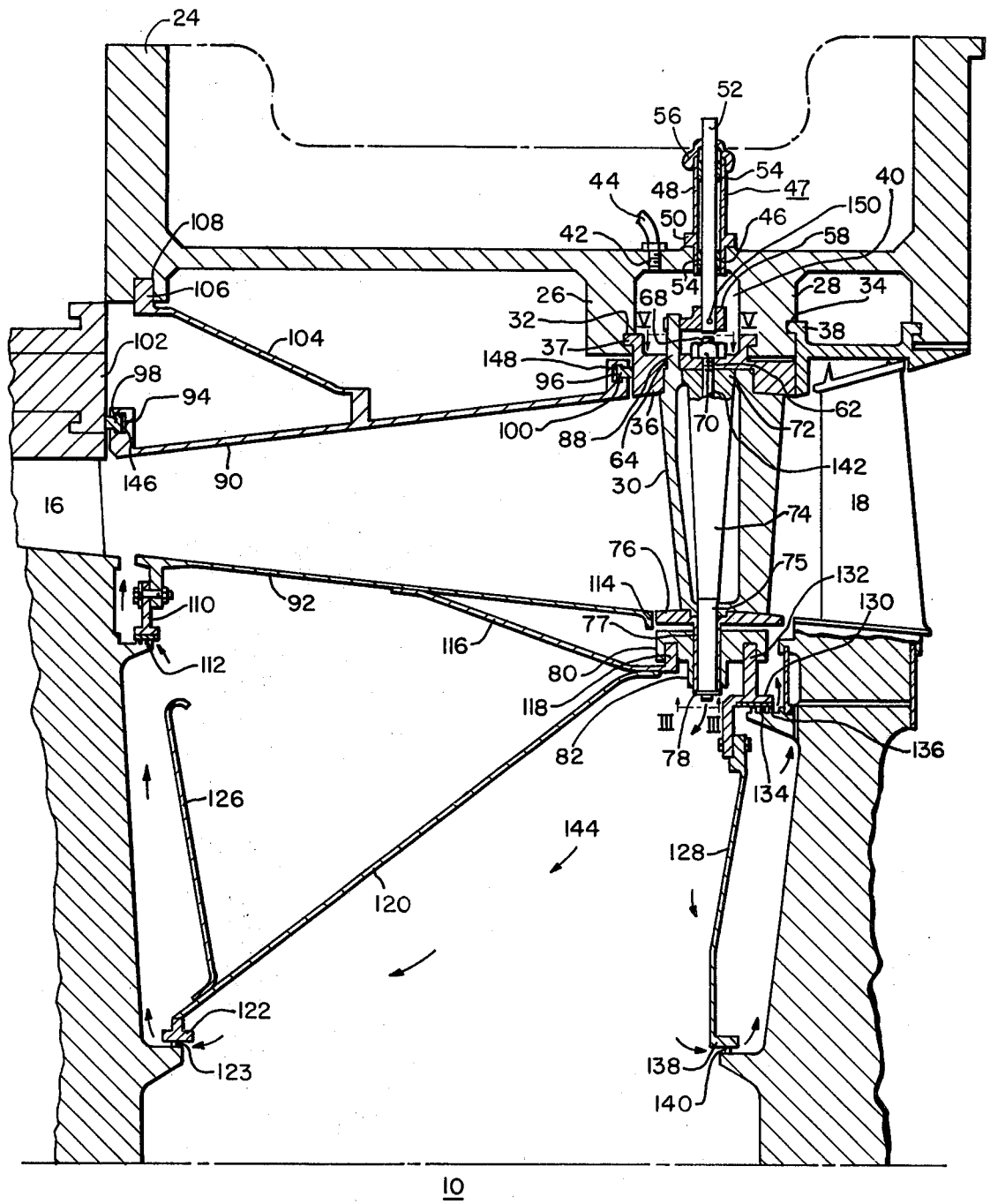
FIG. 2 is an enlarged sectional elevational view of that portion encircled in FIG. 1.

Referring to FIG. 1, a split shaft axial flow gas turbine 10 is schematically illustrated to identify the main components which comprise, in the order of the fluid flow therethrough, a compressor 12, a combustor 14, a high pressure turbine 16 and a low pressure turbine 18. The compressor 12 and the high pressure turbine 16 are connected to a common shaft R″—R″ and form the part of the turbine generally referred to as the gas generator. The low pressure turbine 18 is connected to shaft R′—R′. The load (not shown) is also coupled to shaft R′—R′ as the speed of this shaft is variable independently of the speed of the shaft R″—R″. To optimally direct the working fluid into the low pressure power turbine 18 in accordance with whatever speed it is rotating, variable angle nozzle vanes are disposed in the confined flow path between the outlet of the high pressure turbine 16 and the inlet of the low pressure or power turbine 18, and the present invention is directed to an assembly of the structure defining this path and the variable nozzle vanes therein, generally in the area encompassed by the circle of FIG. 1 which is enlarged in FIG. 2 to show the details of the invention.

Thus, referring to FIG. 2 it is seen that the turbine 10, in this area, comprises an outer casing or housing 24 extending axially generally from the high pressure turbine 16 to the low pressure turbine 18. The housing 24 includes a pair of axially spaced, inwardly directed flanges 26, 28 so that the space therebetween is in axial alignment with the axis of the variable nozzle vane 30, to be described later. Each flange contains an axially opening groove, such as at 32, 34.

An outer shroud 36 bridges the spatial separation of the two flanges 26, 28 and defines spatially separated opposed axially extending tongue members 37, 38, which are received in the grooves 32, 34 in generally a sealing engagement for support thereby of the shroud, in a manner which provides an enclosed space or chamber 40. The outer housing 24 includes an opening 42 into this space which is in communication with compressed air bled from the compressor through line 44 (see FIG. 1). For each vane there are other openings 46 through the housing 24 which are threaded for seating a vane positioning mechanism 47 therein.

The vane positioning mechanism 47 includes an outer tube 48 having external threads on one end for threaded receipt in the opening 46 and an external sealing flange 50. A drive rod 52 extends through the tube 48 and is rotatably held therein by a pair of permanently lubricated sleeve bearings 54. A gland nut 56 is threadably secured to the upper end of the tube with the rod 52 projecting therethrough to seal the assembly. The inner end of the rod 52 is disposed within the chamber 40 and supports an axially projecting lever 58, which is forked or has an opening 60 at its free end.

The outer shroud 36 includes openings 62, 64 radially extending from the chamber 40. Opening 62 is in axial alignment with opening 46 of the housing. The threaded end 66 of a support strut 68 extends therethrough from the radially inner face of the outer shroud 36 and is secured as by a nut 70. The support strut includes an enlarged bearing surface 72 immediately adjacent the outer shroud and extends therefrom radially inwardly to an inner reduced circumference tubular extension 74 providing another bearing surface 75. An inner shroud 76 having a radially extending sleeve portion 77 telescopically engages the extension 74 and is secured thereto as by a snap ring 78 received in a groove adjacent the radially innermost end of the extension 74. A split ring 80 defines a radially extending sleeve 82 which engages the like sleeve portion 77 of the inner shroud 76.

The split ring, as seen in FIG. 3, comprises a pair of rings 80a and 80b secured together by bolts 79 extending axially therethrough with each separate section having a radially downwardly open groove 84, 86.

A hollow nozzle vane 30 is disposed between the inner and outer shrouds, with the radial ends thereof in general sealing engagement with the shroud surfaces. The vane 30 encloses the support strut 68 with at least the portion of the vane adjacent each end of the strut rotatably engaging the respective bearing surfaces 72, 75 of the strut for guided, relative, angular movement thereabout. The radially outermost end of the vane 30 provides a finger-like projection 88 extending through the arcuate opening 64 in the outer shroud 36 to be received in the open end or fork 60 of the lever 58 so that as the rod 52 is turned, the vane 30 is turned to the extent permitted by the arcuate slot or opening 64.

The confined flow path leading from the last stage of the high pressure turbine 18 is defined by radially diverging inner and outer wall members 90, 92. Still referring to FIG. 1, it is seen that the opposed axial ends of the outer wall member 90 are grooved as at 94, 96 to accommodate projections 98, 100 extending from, on one end the outer shroud 36 and on the opposite end, a shroud 102 encircling the blade of the high pressure turbine 18. The outer wall 90 is supported medially by a slanting flange 104 extending between the wall and terminating in a tongue-like web 106 received in a groove 108 in the housing 24.

The inner wall 92 extends from generally adjacent the high pressure turbine 18 where it supports a seal 110 extending radially inwardly to engage a lip seal 112 on the last stage disc of the high pressure turbine, to adjacent the inner shroud 76, terminating in a downward edge 114. A lower support 116 extends from a medial position on the inner wall 92 to terminate in an upwardly extending tongue 118 receiving a groove 84 of split ring 80. A baffle 120 is also supported from this lower support 116 and extends to adjacent the high pressure turbine disc to terminate in a seal 122 in engagement with inner lip seals 123 on the disc. A skirt portion 126 extends radially therefrom.

A second baffle 128 is supported adjacent the disc of the low pressure turbine 18 through a seal member 130 having a tongue 132 within the other groove 86 of the split ring 80 and an axially extending shoulder 134 engaging outer lip seals 136 on the low pressure turbine disc and an inner shoulder 138 engaging an inner lip seal 140 on the low pressure disc.

A further provision of the present invention is, in the preferred embodiment, employing a strut 68 which is hollow throughout its radial extent providing a passage 142 for cooling air communication between the chamber 40 and the inner cavity 144 of the turbine 10. Thus, air delivered to the chamber 40 through conduit 44 flows through the strut 68 (where it is also possible to bleed off a sufficient quantity into the hollow blade 30 with passages therein for cooling the blade as desired although not shown) and into the inner cavity 144 where it is, through controlled leakage at the various seals, permitted to pass adjacent the discs and blade roots of the high pressure turbine and low pressure turbine to cool them before flowing back into the main flow path as shown by the arrows.

Also, referring to FIGS. 2 and 4, it is noted that certain gaps between adjacent parts have been provided to accommodate expansion as the parts become heated. Thus, expansion of the outer wall 90 is accommodated by gaps 146, 148 in the grooves 94, 96 therein. Also, as the inner wall 92 is only supported from one end, the free end is able to expand axially without interference. It is to be noted that the supports 116, 104 of both the inner and outer walls extend angularly, primarily axially, to accommodate expansion or contraction without buckling and without deforming the respectively supported wall.

Radial expansion of the vane 30 is accommodated, as shown in FIGS. 2 and 4, by the inner shroud 76 attached to the vane 30 being radially displaced from the split ring 80 to accommodate growth or expansion. However, to ensure alignment of the inner shroud with the split ring, a tongue 150 extends downwardly from the inner shroud for receipt within a groove 152 in the split ring. The base of the groove is radially displaced from the tongue to maintain a gap 154, similar to other opposed adjacent surfaces between these two components.

It is to be understood that the view of FIG. 2 shows components that generally continue annularly around the turbine so that the confined air flow path is an annular passageway. The annular parts are semicircular, being joined by flanges on the horizontal plane. Thus, with this in mind, the turbine is assembled in the following manner: the struts 68 are initially secured to the outer shroud 36 exteriorly of the turbine (i.e., the shroud 36 comprises individual arcuate segments with each segment containing one strut) via the nut 70 and threaded stem of the strut. The vanes 30 are then placed over the strut from the radially inner end thereof with the finger 88 inserted into the arcuate opening 64 in the outer shroud. The inner shroud 76 (also segmented as the outer shroud) is then mounted to the lower end of the vane 30 and held to the strut 58 as by the snap ring 78. The vane positioning mechanism 47 is inserted in the openings 46 in the housing; however, the outer tube is not at this time screwed in place. The forked lever 58 is then attached, as through spring pin 158 to the drive rod 52. The vane positioning mechanism is then moved radially outwardly to allow the outer shroud 36 (with the blade and inner shroud and strut assembled thereto) to be annularly slid into the tongue and groove arrangement shown in FIG. 1. The separate halves 80a and 80b of the split ring 80, which are each preferably semicircular, are bolted together so as to receive within the sleeve 82 thereof the sleeve portions 77 of a similar semicircular array of the inner shrouds. The vane positioning mechanism is permitted to move inwardly so that the forked lever 58 engages the finger 88 of the vane and then the outer tube 48 is secured, as by screwing, to the housing. The inner wall 92 and the baffle 128 (each being preferably semicircular in extent) are placed in proper position simply by aligning the respective tongue 118, 132 with the proper groove 84, 86 on the split ring and sliding them together. It is noted that the inturned lip 114 on the inner wall 92 does not extend axially beyond the split ring so that it can be slid therepast without interference. The half of the housing as thus assembled is attached, as by bolting to the housing on either axial end thereof and then the outer wall 90

(also semicircular in extent) is circumferentially slid into position as guided by the cooperating tongue and groove mounting arrangement. Each half of the turbine housing is assembled as above, and then the two halves are bolted together to complete the assembly and provide the annular confined passageway.

It is to be understood that the drive rods of the vane positioning mechanism are operated in unison by a linkage system, not shown, and which is not a part of this invention. However, for the purpose of illustrating a typical range of angular movement of the vane of the variable nozzle vanes, FIG. 5 is referred to which shows a vane positioned at each extremity of its travel.

Thus, an assembly is shown for supporting a variable nozzle vane and the wall members defining the annular working fluid passage between the high pressure turbine and the low pressure turbine of a split shaft gas engine with the support being such that it does not interfere with the normal flow of the working fluid through the passage.

I claim:

1. In a gas turbine having structure defining a confined annular flow path including an inner annular wall and an outer annular wall, an annular array of vanes disposed within said flow path, and a casing for housing said structure and wherein said structure and said vanes form a part of an assembly generally supported from said casing, said assembly comprising:

an outer shroud member supported from said casing;
an inner shroud member;
an inner ring member axially aligned with and radially inwardly of said inner shroud member;
strut means secured to said outer shroud member and extending radially inwardly providing the sole support for said inner shroud member and said inner ring member;
vane means extending radially between said outer and inner shroud members and enclosing said strut means across said radial extent;
means for supporting said inner annular wall, solely from said inner ring member;
whereby said inner shroud member, said inner ring member, and said inner annular wall are solely supported from said casing through said strut and said outer shroud member, and the portion of said strut extending across the flow path is enclosed by said vane.

2. Structure according to claim 1 wherein:
said inner shroud member and said ring member are separated by a radial gap between adjacent facing surfaces to allow for movement therebetween caused by radial expansion of said vane and wherein said adjacent facing surfaces of said two members define axially abutting portions to prevent axial movement therebetween.

3. Structure according to claim 1 wherein:
said vane is pivotally mounted on said strut and includes means extending radially outwardly from the outer end of said vane through an arcuate aperture in said outer shroud member for engagement with vane rotating means secured to and extending through said casing.

4. Structure according to claim 1 wherein:
said support for said outer shroud comprises a pair of axially spatially opposed radially inwardly extending flange members with said outer shroud member supported in generally sealing engagement therewith across said spatial separation to define a chamber and wherein:
said radially outer end of said strut extends into said chamber, said strut being hollow throughout its radial extent to provide fluid flow communication between said chamber and the space in said turbine radially inwardly of said inner shroud.

5. Structure according to claim 3 wherein:
said support for said outer shroud comprises a pair of axially spatially opposed radially inwardly extending flange members with said outer shroud member supported in generally sealing engagement therewith across said spatial separation to define a chamber and wherein:
said radially outer end of said strut extends into said chamber, said strut being hollow throughout its radial extent to provide fluid flow communication between said chamber and the space in said turbine radially inwardly of said inner shroud.

6. Structure according to claim 5 wherein:
the extreme positions of said variable vane are determined by abutment of said extending portion with the extreme ends of said arcuate slot in said shroud.

7. Structure according to claim 5 wherein:
said outer shroud member is secured to said flange members in a tongue-and-groove arrangement providing circumferential relative movement therebetween for assembly.

8. An assembly including structure defining a confined flow path for the motive fluid between the high-pressure turbine and the low-pressure turbine of a split shaft gas turbine engine and a variable vane disposed within said flow path generally adjacent said low-pressure turbine, said engine having a housing generally enclosing the rotating apparatus and providing radially inwardly extending flange means for supporting said assembly, said assembly comprising:

an outer shroud member supported from said flange means in a tongue-and-groove arrangement providing generally sealing engagement therebetween and defining a substantially closed chamber between said housing and said outer shroud, said shroud further defining first and second openings communicating with said chamber;
radially extending hollow strut means stationarily secured to said outer shroud in flow communication with said first opening, said strut means having a bearing surface adjacent said outer shroud and extending radially inwardly therefrom to terminate in a generally cylindrical inner end;
an inner shroud member having an aperture for receipt of said strut means generally adjacent the radially inner end of said strut means said strut means providing the sole support for said inner shroud;
a hollow vane enclosing the portion of said strut means traversing said flow path and extending radially between said outer and inner shroud and engaging the bearing and cylindrical end of said strut means for rotation thereabout, said vane having an upwardly extending member passing through said second opening in said outer shroud and into said chamber;
means mounted on said housing and extending into said chamber to engage said upwardly extending member for rotationally positioning said vane;
a support ring in axial alignment with said inner shroud member and engaging the inner end of said strut means for the sole support of said support ring thereon, said ring radially spaced from said inner shroud member to provide a gap to accommodate radial movement of said inner shroud as said vane expands;

radially opposed wall members axially extending from adjacent said high-pressure turbine to said inner and outer shroud members respectively; and means for supporting the radially inner wall member solely from said support ring.

9. Structure according to claim 8 including means for supplying said chamber with cooling air whereby said air is directed through said strut means to radially inwardly of said inner wall member to cool the disks and blade roots of said high-pressure and low-pressure turbine.

* * * * *